United States Patent [19]

Usami et al.

[11] Patent Number: 4,598,035

[45] Date of Patent: Jul. 1, 1986

[54] HEAT-SENSITIVE RECORDING MATERIAL CONTAINING MICROCAPSULES CONTAINING COLORING COMPONENT(S) AND ORGANIC SOLVENT

[75] Inventors: Toshimasa Usami; Toshiharu Tanaka, both of Shizuoka, Japan

[73] Assignee: Fuji Photo Film Co., Ltd., Kanagawa, Japan

[21] Appl. No.: 716,301

[22] Filed: Mar. 26, 1985

[30] Foreign Application Priority Data

Mar. 26, 1984 [JP] Japan .............................. 59-59231

[51] Int. Cl.$^4$ .......................... B32B 7/02; G03C 1/52; G03C 5/24

[52] U.S. Cl. .................................... 430/138; 427/212; 430/151; 430/171; 430/177; 430/179

[58] Field of Search ............... 430/138, 151, 179, 171, 430/177; 427/212

[56] References Cited

U.S. PATENT DOCUMENTS 4,411,979 10/1983 Nagamoto et al. ................ 430/176
4,517,141 5/1985 Dahm et al. ........................ 430/138

FOREIGN PATENT DOCUMENTS 0123224 10/1984 European Pat. Off. ............ 430/138

*Primary Examiner*—John E. Kittle
*Assistant Examiner*—Mukund J. Shah
*Attorney, Agent, or Firm*—Sughrue, Mion, Zinn Macpeak & Seas

[57] ABSTRACT

A heat-sensitive recording material, comprising a support having thereon a layer containing microcapsules containing at least a first component capable of causing a coloring reaction as a core material, and, outside of the microcapsules, at least a second component causing said coloring reaction with said first component in the microcapsules, wherein the microcapsules contain an organic solvent in the cores thereof, the average particle size of the microcapsules is 8 microns or less, and the value of (number average wall thickness δ (in microns)/volume average particle size D (in microns)) of the microcapsules is $1\times10^{-2}$ or more. The coloring components that may be used in the core include leuco dyes and diazo compounds. The organic solvents have a boiling of 180° C. or more. The heat-sensitive recording material has excellent pressure are friction resistance, a high heat coloring property and an excellent production aptitude.

20 Claims, No Drawings

HEAT-SENSITIVE RECORDING MATERIAL CONTAINING MICROCAPSULES CONTAINING COLORING COMPONENT(S) AND ORGANIC SOLVENT

FIELD OF THE INVENTION

This invention relates to heat-sensitive recording materials. More particularly, the invention relates to heat-sensitive materials having excellent friction resistance before heat recording and providing high coloring density upon heat recording.

BACKGROUND OF THE INVENTION

A heat-sensitive recording process has recently been widely used in the fields of facsimile recording and printers, since the process has such advantages as (1) a liquid development treatment is unnecessary, (2) when the support for the heat-sensitive recording material is paper, the quality of the paper support may be that of an ordinary paper, (3) the process can be easily handled, (4) the coloring density is high, (5) the recording device for the recording process is simple and inexpensive, (6) the process does not generate noise during recording, etc. As heat-sensitive recording materials for the recording process, leuco coloring-type heat-sensitive recording materials providing excellent color density and coloring speed are mainly used.

Also, as an other process, there is known a process of heating a heat-sensitive recording material having a layer composed of a diazo compound, a coupling component, and an alkali generating agent or a coloring aid in order to conduct recording, and thereafter irradiating the recording material with light to decompose the unreacted diazo compound and stop the coloring, as disclosed, for example, in Japanese Patent Application (OPI) Nos. 123086/82, 125092/82 (corresponding to U.S. Pat. No. 4,411,979), etc. (the term "OPI" as used herein refers to a "published unexamined Japanese patent application").

On the other hand, Japanese Patent Application (OPI) No. 190886/84 (corresponding to U.S. patent application Ser. No. 600,267 filed Apr. 13, 1984) discloses a heat-sensitive recording material having an improved storability (shelf stability) using a microcapsule.

When the recording material is heated, the coloring component contained in the microcapsules permeates through the capsule wall to the outside thereof, or the other coloring component existing outside of the microcapsules permeates through the capsule wall into the capsule, thereby causing coloring in each case.

In accordance with a microscopic investigation, etc., it has been found that the coloring reaction in fact mainly occurs in the microcapsules. Accordingly, the reaction components before and after typewriting or writing are separated by the capsule wall, whereby the resistance and stability greater than those of the known heat-sensitive recording materials having a protective layer provided thereon.

However, since the microcapsules have an inherent tendency to be collapsed by pressing, it sometimes happens that the microcapsules are collapsed by unexpected pressing or during processing or handling of the recording material, or during heat recording using the recording material, to cause undesirable coloring.

SUMMARY OF THE INVENTION

A first object of this invention, therefore, is to provide a recording material having excellent pressure and friction resistance and a high heat coloring property.

A second object of this invention is to provide a recording material having excellent production aptitude.

As a result of extensive investigations, the inventors have discovered that the aforesaid objects can be attained by the heat-sensitive material of this invention as set forth hereinbelow.

That is, according to this invention, a heat-sensitive recording material is provided comprising a support having thereon a layer containing microcapsules containing at least a first component capable of causing a coloring reaction as the core material, and at least a second component causing said coloring reaction with the component in the microcapsules, wherein the microcapsules contain an organic solvent in the cores, the average particle size of the microcapsules is 8 microns or less, and the value of (number average wall thickness δ (in microns)/volume average particle size D (in microns)) of the capsules is $1\times10^{-2}$ or more.

According to one embodiment of this invention, the heat-sensitive recording material (1) is composed of a support having thereon a layer containing microcapsules containing a leuco dye as the core materials and, outside of the microcapsules, a developer for coloring the leuco dye.

According to another embodiment of this invention, the heat-sensitive recording material (2) is composed of a support having thereon a layer containing microcapsules containing at least a diazo compound among the diazo compound and coupling agent capable of causing a coupling reaction with the diazo compound as the core material, and, outside of the microcapsules, at least one coupling agent.

DESCRIPTION OF THE PREFERRED EMBODIMENT

The microcapsules for use in this invention are not a type for conventional recording materials, wherein the microcapsules may be easily collapsed by heat or pressure such that a reactive material contained in the core of the microcapsules is brought into contact with a reactive material existing outside the microcapsules to cause a coloring reaction, but rather are a type wherein by heating a reactive material in the cores of the microcapsules and a reactive material existing outside the microcapsules, one of the reactive materials permeates through the wall of the microcapsule to cause a coloring reaction with the other coloring component.

It is known that when a microcapsule wall is formed by a polymerization method, the wall becomes incompletely impermeable and has some permeability. The permeability of a microcapsule wall indicates the property whereby a low molecular weight material gradually permeates through the wall over a long period of time, but a phenomenon wherein a reactive material instantly permeates through the microcapsule wall upon heating as in this invention has not been known.

Accordingly, the microcapsule wall of this invention is not necessarily melted by heating. When the microcapsule wall is melted, the higher the melting point of the microcapsule wall is, the better the shelf life of the recording material becomes in this invention.

When the microcapsule walls formed by removing the core material or materials from the microcapsules for use in this invention are heated, the walls of the microcapsules are, in appearance, scarcely melted.

In the heat-sensitive recording materials (1) and (2) of this invention, heat recording is applicable when any one of the components causing the coloring reaction is present in the core of the microcapsules. However, it has been found that when the leuco dye in the case of the recording material (1) or the diazo compound in the case of the recording material (2) is incorporated in the core of the microcapsule, the heat coloring property is higher. Also, it has further been found that when the coloring component is dissolved in an organic solvent, the shelf life of the coloring component is greatly prolonged, and furthermore the reactivity and the coloring density of the coloring component become high.

Since an organic solvent having a low boiling point is accompanied by an evaporation loss during the storage of the organic solvent or a solution of the coloring component in the organic solvent, it is preferred that an organic solvent having a boiling point of 180° C. or more be used in this invention. The organic solvent for use in this invention includes phosphoric acid esters, phthalic acid esters, carboxylic acid esters, fatty acid amides, alkylated biphenyls, alkylated terphenyls, chlorinated paraffin, alkylated naphthalenes, diarylethane, etc. Specific examples of the organic solvent for use in this invention are tricresyl phosphate, trioctyl phosphate, octyldiphenyl phosphate, tricyclohexyl phosphate, dibutyl phthalate, dioctyl phthalate, dilauryl phthalate, dicyclohexyl phthalate, butyl oleate, diethylene glycol dibenzoate, dioctyl sebacate, dibutyl sebacate, dioctyl adipate, trioctyl trimellitate, acetyltriethyl citrate, octyl maleate, dibutyl maleate, isopropylbiphenyl, isoamylbiphenyl, chlorinated paraffin, diisopropylnaphthalene, 1,1'-ditolylethane, 2,4-di-tertiaryaminophenyl, N,N-dibutyl-2-butoxy-5-tertiaryoctylaniline, etc. Among these solvents, the ester series solvents such as diethyl phthalate, dibutyl phthalate, tricresyl phosphate, dibutyl maleate, etc., are preferred.

However, when an organic solvent is used for microcapsules, the occurrence of friction fog during handling of the recording materials containing the microcapsules becomes severe. That is, it has been found that when the organic solvent is contained in the microcapsules, large microcapsules protrude beyond the surface of the coated layer and are brought into direct contact with an outer force to be damaged, smashed or distored, whereby the core material contained in the microcapsules is liable to be revealed or exposed to form fog.

As a countermeasure for this problem, it is known in a pressure-sensitive recording paper that by adding inorganic or organic fine particles to the recording layer containing the microcapsules, the contact of the microcapsules with an outside force is prevented, and, thereby, the formation of fog is prevented. In the heat-sensitive recording material of this invention, the friction resistance is certainly improved by using inorganic or organic fine particles. However, the addition of fine particles results in a reduction in coloring density.

Accordingly, it is fundamentally important that the friction resistance of the microcapsule itself be high. In the case of synthetic resin capsules, the friction resistance of the capsules can be estimated by the ratio of the thickness of the capsule wall to the particle size of the capsule. That is, it has also been found that when the volume average particle size D (micron) of capsules and the number average wall thickness δ (micron) of the capsules are measured by the methods described hereinbelow, capsules having δ/D value of $1\times10^{-2}$ or more (up to an upper limit of $5\times10^{-1}$, preferably $4\times10^{-1}$) are excellent in pressure resistance and scratch resistance.

On the other hand, if the size of the microcapsules is large, the contact of the core material of the microcapsules with other coloring material or materials existing outside of the microcapsule by heat becomes less in the case of heating for a short period of time, which results in reducing the coloring density of the recording material.

In this specification, the volume average particle size of microcapsules was measured by means of a particle size measurement device, Microtrack (Model 7991-3), made by Leeds & Northrup Co.

The volume average particle size can be determined by the following relationship:

$$Mv(\mu m)=\Sigma NiMi^2/\Sigma NiMi$$

wherein Mv is a volume average particle size, Mi is a volume of particle, and Ni is a number of particle.

Also, the number average wall thickness of microcapsules was measured as follows.

A microcapsule liquid was applied on a polyethylene terephthalate film base which was subjected to a surface treatment, and, after fixing the liquid with an epoxy resin, the liquid thus applied was allowed to stand for 24 hours at 60° C., whereby the liquid was solidified and microcapsules were formed. The microcapsules thus formed were cut into exact halves by means of a super microtome, MT-1 Type, made by Du Pont Co. to provide super thin cut pieces of microcapsules. The super thin cut pieces were photographed by means of a transmission-type electron microscope, HU-12A Type, made by Hitachi, Ltd., at about 10,000 to 50,000 magnifications and at an acceleration voltage of 100 KV using a photographic film (Fuji Electron Microscope FG Film, made by Fuji Photo Film Co., Ltd.), the thickness of the microcapsule walls was measured from the photographs, and the number average wall thickness δ (micron) was calculated by averaging the wall thicknesses thus obtained. The preferred number average wall thickness δ is more than 0.001 μm and not more than 4 μm.

Thus, while changing the particle size of microcapsules and the wall thickness of microcapsules, the relation between the ratio of the number average wall thickness δ to the volume average particle size D of the microcapsules, and the friction resistance and coloring density of the microcapsules was investigated and as the result thereof, it has been found that microcapsules having the average particle size of 8 microns or less, preferably 0.1 to 8 microns, more preferably 0.1 to 2 microns, and a δ/D value of $1\times10^{-2}$ or more, preferably 0.01 to 0.5, more preferably 0.05 to 0.2, give reduced fog and high coloring density. More preferably, the microcapsules have a volume average particle size of 8 microns or less and a δ/D value of $2\times10^{-2}$ or more.

The leuco dye which is used for the heat-sensitive recording material (1) of this invention is a material having a property of being colored by donating electron or accepting proton and there is no restriction about the leuco dye if the dye has the aforesaid property but ordinary compounds which are colorless or almost colorless and has a partial skeleton such as lactone, lactam, saltone, spiropyran, ester, amide, etc., said partial skeleton causing ring opening or cleavage by the contact with a developer, are used. Specific examples of the leuco dye are Crystal Violet Lactone, Benzoyl Leuco Methylene Blue, Malachite Green Lactone, Rhodamine B Lactam, 1,3,3-trimethyl-6′-ethyl-8′-butoxyindolinobenzspiropyran, etc.

As the developer for these color formers, phenol compounds, organic acids or the metal salts thereof, oxybenzoic acid esters, clays, etc., are preferably used.

In particular, phenols that are sparingly soluble in water or organic acids having a melting point of 50° to 250° C., and preferably 60° to 200° C., are desirable.

Examples of the phenol compounds which are used as the developer in this invention are 4,4′-isopropylidene-diphenol(bisphenol A), p-tert-butylphenol, 2,4-dinitrophenol, 3,4-dichlorophenol, 4,4′-methylene-bis(2,6-di-tert-butylphenol), p-phenylphenol, 4,4-cyclohexylidenediphenol, 2,2′-methylenebis(4-tert-butylphenol), 2,2′-methylenebis(α-phenyl-p-cresol)thiodiphenol, 4,4′-thiobis(6-tert-butyl-m-cresol), sulfonyldiphenol, 1,1-bis(4-hydroxyphenyl)-n-dodecane, 4,4′-bis(4-hydroxyphenyl)-1-pentoic acid ethyl ester, a p-tert-butylphenol formalin condensation product, a p-phenylphenol formalin condensation product, etc.

Examples of the organic acid or the metal salts thereof which are used as the developer in this invention are 3-tert-butylsalicylic acid, 3,5-tert-butylsalicylic acid, 5-α-methylbenzylsalicylic acid, 3,5-di-α-methylbenzylsalicylic acid, 3-tert-octylsalicylic acid, 5-α,γ-dimethyl-α-phenyl-γ-phenylpropylsalicylic acid, etc., and zinc salts, lead salts, aluminum salts, magnesium salts, nickel salts, etc., of these acids.

Examples of the oxybenzoic acid esters are ethyl p-oxybenzoate, butyl p-oxybenzoate, heptyl p-oxybenzoate, benzyl p-oxybenzoate, etc.

The amounts of the foregoing compounds used per unit area ($m^2$) is generally from 0.05 to 1.5 g, and preferably from 0.05 to 0.4 g, for the leuco dye; and generally from 0.5 to 8 g, and preferably from 0.5 to 4 g, for the developer.

The diazo compound which is used for the heat-sensitive recording material (2) of this invention is a diazonium salt represented by the formula $ArN_2^+X^-$, wherein Ar represents a substituted or unsubstituted aromatic moiety $N_2^+$ represents a diazonium group, and $X^-$ represents an acid anion. The diazonium salt can be colored by causing a coupling reaction with a coupling component, or can be decomposed by the action of light.

Specific examples of the diazonium compound forming the diazonium salt are 4-diazo-1-dimethylaminobenzene, 4-diazo-1-diethylaminobenzene, 4-diazo-1-dipropylaminobenzene, 4-diazo-1-methylbenzylaminobenzene, 4-diazo-1-dibenzylaminobenzene, 4-diazo-1-ethylhydroxyethylaminobenzene, 4-diazo-1-diethylamino-3-methoxybenzene, 4-diazo-1-dimethylamino-2-methylbenzene, 4-diazo-1-benzoylamino-2,5-diethoxybenzene, 4-diazo-1-morpholinobenzene, 4-diazo-1-morpholino-2,5-diethoxybenzene, 4-diazo-1-morpholino-2,5-dibutyoxybenzene, 4-diazo-1-anilinobenzene, 4-diazo-1-toluylmercapto-2,5-diethoxybenzene, 4-diazo-1,4-methoxybenzoylamino-2,5-diethoxybenzene, etc.

Specific examples of the acid anion shown by $X^-$ of the foregoing formula are $C_nF_{2n+1}COO^-$ (wherein n is an integer of 3 to 9), $C_mF_{2m+1}SO_3^-$ (wherein m is an integer of 2 to 8), $(C_lF_{2l+1}SO_2)_2CH^-$ (wherein l is an integer of 1 to 18),

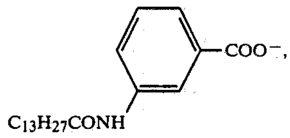

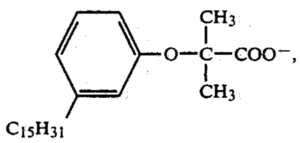

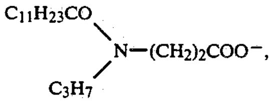

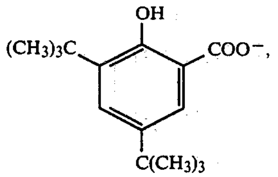

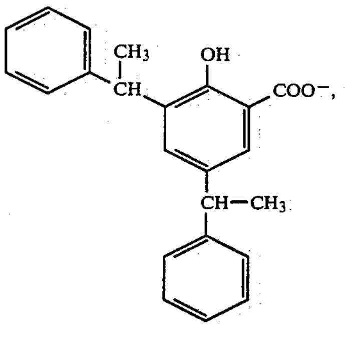

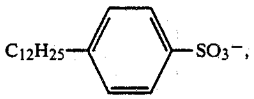

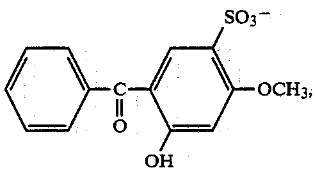

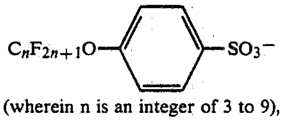

(wherein n is an integer of 3 to 9),

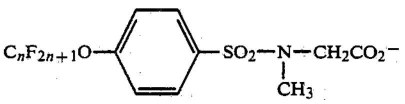

(wherein n is an integer of 3 to 9), $BF_4^-$, $PF_6^-$, etc.

In particular, the acid anion containing a perfluoroalkyl group, a perfluoroalkenyl group, or $PF_6^-$ results in less formation of fog during storage, and is thus preferred.

Specific examples of the diazo compound (diazonium salt) for use in this invention are illustrated below.

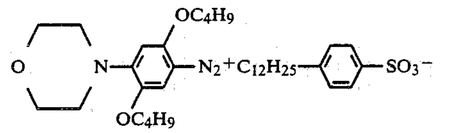

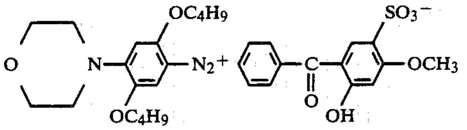

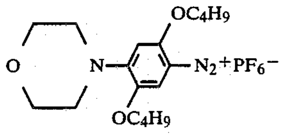

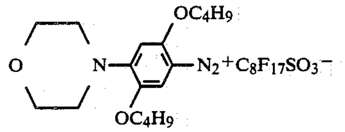

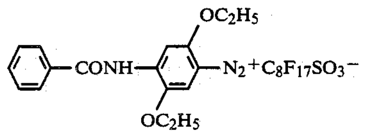

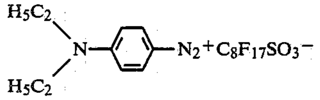

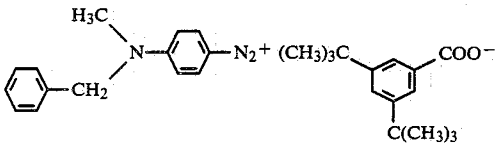

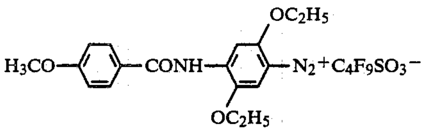

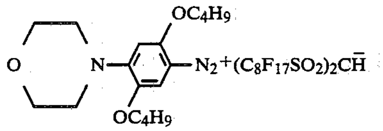

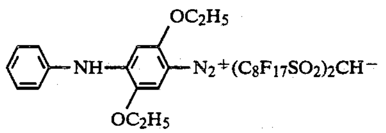

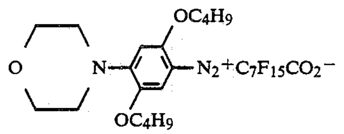

-continued

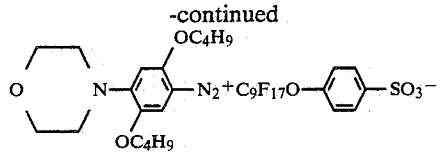

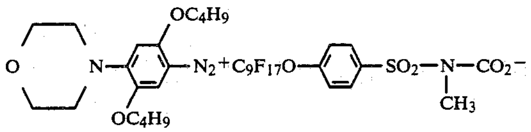

The coupling agent which is used for the heat-sensitive recording material (2) of this invention is a compound capable of forming a dye by causing a coupling reaction with the aforesaid diazo compound (diazonium salt) under a basic atmosphere and specific examples are resorcin, fluoroglucin, sodium 2,3-dihydroxynaphthalene-6-sulfonate, 1-hydroxy-2-naphthoic acid morpholinopropylamide, 1,5-dihydroxynaphthalene, 2,3-dihydroxynaphthalene, 2,3-dihydroxy-6-sulfanylnaphthalene, 2-hydroxy-3-naphthoic acid morpholinopropylamide, 2-hydroxy-3-naphthoic acid anilide, 2-hydroxy-3-naphthoic acid 2′-methylanilide, 2-hydroxy-3-naphthoic acid ethanolamide, 2-hydroxy-3-naphthoic acid octylamide, 2-hydroxy-3-naphthoic acid N-dodecyloxypropylamide, 2-hydroxy-3-naphthoic acid tetradecylamide, acetoanilide, acetoacetoanilide, benzoylacetoanilide, 1-phenyl-3-methyl-5-pyrazolone, 1-(2′,4′,6′-trichlorophenyl)-3-benzamido-5-pyrazolone, 1-(2′,4′,6′-trichlorophenyl)-3-anilino-5-pyrazolone, 1-phenyl-3-phenylacetamido-5-pyrazolone, etc. Furthermore, by using two or more kinds of these coupling agents, images having an optional color tone can be obtained.

In the heat-sensitive recording material (2) of this invention, the coloring aid such as a water sparingly soluble or water-insoluble basic material or a material generating an alkali may be preferably used to increase the color density.

The examples of the coloring aid include inorganic and organic ammonium salts, organic amines, amides, urea and thiourea as well as the derivatives thereof, thiazoles, pyrroles, pyrimidines, piperazines, guanidines, indoles, imidazoles, imidazolidines, triazoles, morpholines, piperidines, amidines, formamidines, pyridines, etc. Specific examples of the coloring aid are ammonium acetate, tricyclohexylamine, tribenzylamine, octadecylbenzylamine, stearylamine, allylurea, thiourea, methylthiourea, allylthiourea, ethylenethiourea, 2-benzylimidazole, 4-phenylimidazole, 2-phenyl-4-methyl-imidazole, 2-undecyl-imidazoline, 2,4,5-trifuryl-2-imidazoline, 1,2-diphenyl-4,4-dimethyl-2-imidazoline, 2-phenyl-2-imidazoline, 1,2,3-triphenylguanidine, 1,2-ditolylguanidine, 1,2-dicyclohexylguanidine, 1,2,3-tricyclohexylguanidine, guanidine trichloroacetate, N,N′-dibenzylpiperazine, 4,4′-dithiomorpholine, morpholinium trichloroacetate, 2-amino-benzothiazole, 2-benzylhydrazinobenzothiazole, etc. These coloring aids may be used singly or as a mixture thereof.

One of the coupling agent and the coloring aid may be incorporated in the microcapsules containing the diazo compound.

Also, the coupling agent and/or the coloring aid may be incorporated in microcapsules different from the microcapsules containing the diazo compound or may be simply added to the layer of the microcapsules containing the diazo compound. In the case of not incorporating the coupling agent and/or the coupling aid in microcapsules, it is better to finely disperse the component or components as particles. The addition amount thereof is preferably from 0.1 to 10 parts by weight for the coupling agent and from 0 to 20 parts by weight, more preferably 0.1 to 20 parts by weight, for the coloring aid per one part by weight of the diazo compound. Also, it is preferred that the diazo compound be used at a coverage of from 0.05 to 2.0 g/m$^2$.

The microcapsules for the heat-sensitive recording maerials (1) and (2) of this invention can be prepared by emulsifying the core material or materials to form oil droplets and forming walls or shells of a polymeric material around the oil droplets. A reactant or reactants for forming the polymeric material are added to the inside and/or the outside of the oil droplets. Specific examples of the polymeric materials include polyurethane, polyurea, polyamide, polyester, polycarbonate, a urea-formaldehyde resin, a melamine resin, polystyrene, a styrene/methacrylate copolymer, a styrene/acrylate copolymer, gelatin, polyvinylpyrrolidone, polyvinyl alcohol, etc.

These polymeric materials may be used singly or as a mixture of them. Preferred polymeric materials are polyurethane, polyurea, polyamide, polyester, and polycarbonate and more preferred polymeric materials are polyurethane and polyurea.

For forming microcapsule walls in this invention, the use of a microencapsulation method by the polymerization of a reactant or reactants from the inside of the droplets is particularly effective. That is, by the foregoing method, microcapsules which have uniform particle size and can be used for a recording material having excellent shelf life can be obtained for a short period of time.

This microencapsulation method and the specific examples of the compounds for the methods are described in U.S. Pat. Nos. 3,726,804 and 3,796,669.

For example, in the case of using polyurethane for the walls of the microcapsules, a polyvalent isocyanate and a second material (e.g., a polyol) capable of forming a capsule wall by reaction with the isocyanate are mixed with an oily liquid to be microencapsulated, the resultant mixture is emulsified in water, and then the temperature of the emulsion thus formed is increased, whereby the reactants cause a polymer-forming reaction at the interfaces of the oil droplets to form the microcapsule walls. In this case, a low boiling auxiliary solvent having a strong dissolving power may be used in the oily liquid.

Polyisocyanates and the polyols or polyamines to be reacted with the polyisocyanates, which are used for forming the microcapsule walls are disclosed in U.S. Pat. Nos. 3,135,716, 3,281,383, 3,468,922, 3,773,695 and 3,793,268; Japanese Patent Publication Nos. 40347/73 and 24159/74; and Japanese Patent Application (OPI) Nos. 80191/73 and 84086/73.

Also, for accelerating the urethane-forming reaction, a tin salt, etc., can be used as a catalyst.

Furthermore, by properly combining the polyvalent isocyanate, which is the first wall-forming material, and the polyol, which is the second wall-forming material, the heat-transmittance of the reactive material can be changed as desired.

Examples of the polyvalent isocyanate which is the first wall-forming material for use in this invention include diisocyanates such as m-phenylene diisocyanate, p-phenylene diisocyanate, 2,6-tolylene diisocyanate, 2,4-tolylene diisocyanate, naphthalene-1,4-diisocyanate, diphenylmethane-4,4'-diisocyanate, 3,3'-dimethoxy-4,4'-biphenyl diisocyanate, 3,3'-dimethyldiphenylmethane-4,4'-diisocyanate, xylylene-1,4-diisocyanate, 4,4'-diphenylpropane diisocyanate, trimethylene diisocyanate, hexamethylene diisocyanate, propylene-1,2-diisocyanate, butylene-1,2-diisocyanate, cyclohexylene-1,2-diisocyanate, cyclohexylene-1,4-diisocyanate, etc.; triisocyanates such as 4,4',4''-triphenylmethane triisocyanate, toluene-2,4,6-triisocyanate, etc.; tetraisocyanates such as 4,4'-dimethyldiphenylmethane-2,2',5,5'-tetraisocyanate; and isocyanate prepolymers such as an addition product of hexamethylene diisocyanate and trimethylolpropane, an addition product of 2,4-tolylene diisocyanate and trimethylolpropane, an addition product of xylylene diisocyanate and trimethylolpropane, an addition product of tolylene diisocyanate and hexanetriol, etc.

Examples of the polyols which are the second wall-forming material in this invention include aliphatic and aromatic polyhydric alcohols, hydroxypolyesters, hydroxypolyalkylene ethers, etc. Preferred polyols are polyhydroxy compounds having a molecular weight of 5,000 or less and having one of the following groups (I), (II), (III), and (IV) between two hydroxy groups in the molecular structure thereof;

(I) An aliphatic hydrocarbon group of from 2 to 8 carbon atoms;

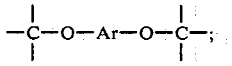
(II)

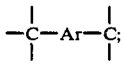 and
(III)

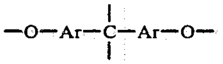
(IV)

wherein Ar in formulae (II), (III), and (VI) represent a substituted or unsubstituted aromatic moiety, and the aliphatic hydrocarbon group of formula (I) has $-C_2H_{2n}-$ as the fundamental skeleton thereof, wherein one or more of the hydrogens may be substituted by another element.

Specific examples of compounds which can form the aliphatic hydrocarbon group of formula (I) include ethylene glycol, 1,3-propanediol, 1,4-butanediol, 1,5-pentaediol, 1,6-hexanediol, 1,7-heptanediol, 1,8-octanediol, propylene glycol, 2,3-dihydroxybutane, 1,2-dihydroxybutane, 1,3-dihydroxybutane, 2,2-dimethyl-1,3-propanediol, 2,4-pentanediol, 2,5-hexanediol, 3-methyl-1,5-pentanediol, 1,4-cyclohexane dimethanol, dihydroxycyclohexane, diethylene glycol, 1,2,6-trihydroxyhexane, phenylethylene glycol, 1,1,1-trimethylolpropane, hexanetriol, pentaerythritol, glycerol, etc.

Examples of compounds which can form the group shown by formula (II) include the condensation products of aromatic polyhydric alcohols such as 1,4-di(2-hydroxyethoxy)benzene, resorcinol dihydroxyethyl ether, etc., and alkylene oxide.

Examples of compounds which can form the group shown by formula (III) include p-xylylene glycol, m-xylylene glycol, α,α'-dihydroxy-p-diisopropylbenzene, etc.

Examples of compounds which can form the group shown by formula (IV) include 4,4'-dihydroxydiphenylmethane, 2-(p,p'-dihydroxydiphenylmethyl)benzyl alcohol, an addition product of bisphenol A and ethylene oxide, an addition product of bisphenol A and propylene oxide, etc.

It is preferred to use the polyol in a proportion that the ratio of the hydroxy group is from 0.02 to 2 moles per mole of the isocyanate group.

In the case of producing microcapsules, a water-soluble polymer can be used in this invention, and examples of such water-soluble polymer include water-soluble anionic polymers, water-soluble nonionic polymers, and water-soluble amphoteric polymers.

As anionic polymers, natural and synthetic anionic polymers can be used, including, for example, water-soluble anionic polymers containing groups such as $—COO^-$, $—SO_3^-$, etc. Specific examples of the natural anionic polymers include gum arabic, alginic acid, etc. Examples of the semisynthetic anionic polymers are carboxymethyl cellulose, phthalated gelatin, sulfated starch, sulfated cellulose, lignin sulfonic acid, etc. Also, examples of the synthetic anionic polymers include maleic anhydride series (including hydrolyzed polymers) copolymers, acrylic acid series (including methacrylic acid series) polymers and copolymers, vinylbenzenesulfonic acid series polymers and copolymers, carboxy-denatured polyvinyl alcohol, etc.

Examples of nonionic polymers include polyvinyl alcohol, hydroxyethyl cellulose, methyl cellulose, etc.

Examples of amphoteric polymers include gelatin, etc.

These water-soluble polymers are used as an aqueous solution of from 0.01 to 10% by weight of each polymer.

The microcapsules for use in this invention can also be produced from an emulsion containing more than 0.2% by weight of the components to be microencapsulated.

It is preferred that the material or materials which are not contained in the microcapsules in the recording material of this invention be used as solid dispersion thereof by means of a sand mill, etc. In this case, the material or materials are each dispersed in aqueous solution of a water-soluble polymer. Preferred water-soluble polymers for use in this case are the water-soluble polymers described above in regard to the production of microcapsules for use in this invention. In this case, the concentration of the water-soluble polymer is generally from 2 to 30% by weight, and the material is dispersed in an aqueous solution of the water-soluble polymer at from 5 to 40% by weight.

The heat-sensitive recording materials (1) and (2) of this invention may further contain pigments such as silica, barium sulfate, titanium oxide, aluminum hydroxide, zinc oxide, calcium carbonate, etc., or fine powders of styrene beads, a urea-melamine resin, etc., for preventing sticking of the recording materials to a thermal head and improving the writability.

Also, a metal soap may be used similarly for preventing sticking of the recording materials of this invention.

The amount of the metal soap is generally from 0.2 to 7 g/m$^2$.

Furthermore, the heat-sensitive recording materials (1) and (2) of this invention may contain a heat fusible material for increasing the heat-recording density. The heat fusible material is a material having a melting point of 50° to 150° C., which can be melted by heating with a thermal head. The heat fusible material dissolves therein the leuco dye, the developer, the diazo compound, the coupling agent, or the coloring aid as described above. The heat fusible material is used as a dispersion of fine particles of from 0.1 to 10 microns, generally in an amount of from 0.2 to 7 g/m$^2$ as solid component. Specific examples of the heat fusible material are fatty acid amides, N-substituted fatty acid amides, ketone compounds, N-substituted carbamate compounds, urea compounds, esters, etc.

The heat-sensitive recording materials (1) and (2) are produced by coating the above-described microcapsules and various components using binders.

As the binders, various emulsions of polyvinyl alcohol, methyl cellulose, carboxymethyl cellulose, hydroxypropyl cellulose, gum arabic, gelatin, polyvinylpyrrolidone, casein, a styrene-butadiene latex, an acrylonitrile-butadiene latex, polyvinyl acetate, polyacrylic acid esters, an ethylene-vinyl acetate copolymer, etc. The amount of the binder is 0.5 to 5 g/m$^2$.

The recording materials of this invention may further contain citric acid, tartaric acid, oxalic acid, boric acid, phosphoric acid, pyrophosphoric acid, etc., as an acid stabilizer in addition to the above-described elements.

The heat-sensitive recording material (1) or (2) of this invention is prepared as follows. That is, microcapsules containing one component or components causing a coloring reaction are mixed with a solid dispersion of another component or components or an aqueous solution of an other component or components to provide a coating liquid and the coating liquid thus prepared is coated on a support such as a paper and a synthetic resin film by a coating method, such as bar coating, blade coating, air knife coating, gravure coating, roll coating, spray coating, dip coating, etc., following by drying to form a heat-sensitive layer of from 2.5 to 15 g/m$^2$ in solid components.

It is advantageous from the viewpoint of the shelf life with the passage of time to use a neutral paper having a heat extraction pH of 6 to 9, which is sized by a neutral sizing agent such as alkylketene dimer, etc., (e.g., Japanese Patent Application (OPI) No. 14281/80 (corresponding to U.S. Pat. No. 4,255,491) as the paper for the support.

Also, for preventing the permeation of the coating liquid into a paper support and improving the contact with the heat-sensitive recording layer with a thermal recording head, a paper having the ratio $$\frac{\text{stocking sizing degree}}{(\text{meter weighing capacity})^2} \geqq 3 \times 10^{-3},$$

and a Beck smoothness of higher than 90 seconds, as described in Japanese Patent Application (OPI) No. 116687/82 (corresponding to U.S. Pat. No. 4,416,939) is advantageous.

Furthermore, a paper having the optical surface roughness of 8 microns or less and a thickness of from 40 to 75 microns described in Japanese Patent Application (OPI) No. 136492/83; a paper having a density of 0.9 g/cm$^3$ or less and an optical contact percentage of 15% or more as described in Japanese Patent Application (OPI) No. 69091/83; a paper manufactured from a pulp having a Canadian standard freeness (JIS P8121) of 400 cc or more for preventing the permeation of a coating liquid in the paper as described in Japanese Patent Application (OPI) No. 69097/83; a paper manufactured by Yankee paper machine the lustrous surface thereof is used as the coating surface for improving the coloring density and the resolving power as described in Japanese Patent Application (OPI) No. 65695/83 (corresponding to U.S. Pat. No. 4,466,007); and a paper subjected to a corona discharging treatment for improving the coating aptitude as described in Japanese Patent Application (OPI) No. 35985/84 can be used in this invention with good results.

Still further, various supports which are used in the field of ordinary heat-sensitive recording papers can be also used as the supports for the heat-sensitive recording materials of this invention.

The heat-sensitive recording materials of this invention can be used as recording papers for printers of facsimiles and electronic computors.

Then, the invention is further explained by the following examples but the invention is not limited to these examples. In addition, all parts, percents and ratios in these examples, unless otherwise indicated, are by weight.

EXAMPLE 1

A developer dispersion having the following composition was prepared.

Bisphenol A: 20 parts

Polyvinyl Alcohol: 5 parts

Water: 100 parts

The above composition was dispersed by means of a sand mill for 24 hours to provide a dispersion of fine particles having an average particle size of 3 microns.

Microcapsule liquids of a color former were prepared as follows.

0.5 part of Leuco dye represented by formula

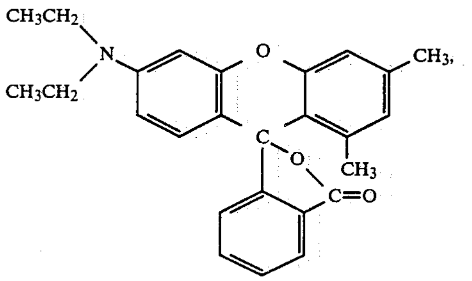

0.9 part of an addition product (molar ratio of 3/1) of toluylene diisocyanate and trimethylolpropane, 3 parts of isopropylnaphthalene, and 0.16 part of an addition product (molar ratio of 1/4) of ethylenediamine and propylene oxide were dissolved in 5 parts of dichloromethane and then the resulting solution was mixed and dissolved to provide a solution as a standard formulation. By following the same procedure as above while reducing the addition ratio of the trimethylolpropane addition product of toluylene diisocyanate to the propylene oxide addition product of ethylenediamine to 1/2, 1/4, 1/6 of that in the standard formulation, capsule liquids were also prepared.

Each of the solutions thus prepared was emulsified in a solution of 2.6 parts of polyvinyl alcohol dissolved in 29 parts of water using a homogenizer (made by Nippon Seiki K.K.). In this case, the size of the emulsified particles was changed by controlling the rotation number of the agitation of the homogenizer. Then, after the emulsification, 100 parts of water was added to the emulsion and the resultant mixture was heated to about 60° C. with stirring for 2 hours to provide microcapsules.

Regarding these microcapsules, the volume average particle size and the number average wall thickness/volume average particle size were measured by the methods noted hereinbefore.

To 10 parts of the developer dispersion prepared before were added 5 parts of the leuco dye capsule-containing liquid prepared above and 3 parts of 5% polyvinyl alcohol to provide a coating liquid, the coating liquid was coated in a bar coating method on a neutral paper of 43 g/m$^2$ by means of a coating rod 24 and dried for 30 minutes at 40° C. to provide a heat-sensitive recording material.

Thus, heat-sensitive recording materials (1) to (8) including the case of adding starch particles having a particle size of about 15 microns to the coating liquid as shown in Table 1 below were prepared.

Heat recording was applied to each of the heat-sensitive recording materials (1) to (8) thus obtained using G-II Mode (Panafax 200), made by Matsushita Graphic Communication Systems, Inc. The density of each recorded image thus obtained was measured by means of a Macbeth reflection densitometer. The results thus obtained are shown in Table 1 below.

Also, the presence of friction for naturally formed during the aforesaid handing of these recording materials was observed, whereby the friction resistance thereof was evaluated. The results are also shown in Table 1.

TABLE 1

| Recording Material | Microcapsule Size (μ) | Microcapsule δ/D | Isocyanates | Starch | Test Result Friction Fog | Test Result Density |
|---|---|---|---|---|---|---|
| (1) (The Invention) | 3 | 0.025 | Standard Amount* | — | Almost None | 1.18 |
| (2) (The Invention) | 4 | 0.020 | Standard Amount* | — | Almost None | 1.16 |
| (3) (The Invention) | 8 | 0.016 | Standard Amount* | — | Almost None | 0.89 |
| (4) (The Invention) | 8 | 0.010 | ⅔ of Stan'd Amount | — | Slightly Observed | 0.99 |
| (5) (Comparison) | 12 | 0.015 | Standard Amount | — | Considerably Observed | 0.61 |
| (6) (Comparison) | 12 | 0.015 | Standard Amount | Added** | Almost None | 0.31 |
| (7) (Comparison) | 12 | 0.008 | ½ of Stan'd Amount | Added** | Slightly Observed | 0.39 |
| (8) | 12 | 0.005 | ¼ of Stan'd | Added** | Considerably | 0.46 |

TABLE 1-continued

| Recording Material | Microcapsule Size (μ) | δ/D | Isocyanates | Starch | Test Result Friction Fog | Density |
|---|---|---|---|---|---|---|
| (Comparison) | | | Amount | | Observed | |

*0.9 part of trimethylolpropane addition product of tolylene diisocyanate and 0.16 part of propylene oxide addition product of ethylenediamine.
**50% by weight of the capsule solid component was added.

As is clear from the results shown in Table 1, the recording materials (1) to (4) of this invention did not form fog and gave high image density. However, the recording material (5) considerably formed fog and gave low image density. On the other hand, the recording material (6) containing starch reduced the formation of fog but gave low image density. The recording material (7) having a δ/D value smaller than than of the recording material (7) slightly increased the image density. Also, the recording material (8) having a small δ/D value formed considerable fog. From the foregoing results, it can be seen that the recording materials of the present invention are excellent for preventing the formation of fog and for their heat coloring properties.

EXAMPLE 2

In a mixture of 20 parts of dibutyl phthalate and 5 parts of ethyl acetate were dissolved 2.5 parts of a diazo compound having the formula shown below and 10 parts of an addition product of xylylene diisocyanate and trimethylpropane (molar ratio: 3/1).

(Diazo Compound):

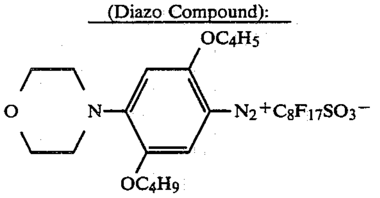

The diazo compound solution thus prepared was mixed with an aqueous solution of 5.2 parts of polyvinyl alcohol dissolved in 58 parts of water and the mixture was emulsified at 20° C. by means of the same homogenizer as in Example 1, while changing the rotation number thereto to provide various emulsion samples. Also, by following the same procedure as above which changing the addition amount of the addition product of xylylene diisocyanate and trimethylolpropane, various emulsions were also produced.

To each of the emulsions thus-obtained was added 100 parts of water and the mixture thus formed was heated to about 60° C. with stirring for 2 hours to provide a capsule liquid containing the diazo compound as the core material of the microcapsules.

Then, a dispersion of a coupling agent was prepared as follows. That is, 20 parts of 2-hydroxy-3-naphthoic acid anilide and 5 parts of polyvinyl alcohol were added to 100 parts of water and dispersed therein for about 24 hours by means of a sand mill to provide a dispersion of the coupling agent having an average particle size of about 1 micron.

Then, 20 parts of triphenylguanidine and 5 parts of polyvinyl alcohol were dispersed in 100 parts of water for 24 hours by means of a sand mill to provide a dispersion of triphenylguanidine having an average particle size of about 1 micron.

Thereafter, 50 parts of the capsule liquid of the diazo compound thus obtained, 15 parts of the dispersion of the coupling agent, and 15 parts of the dispersion of triphenylguanidine prepared above were added to 20 parts of an aqueous solution of 5% zinc stearate to provide a coating liquid. The coating liquid was bar-coated on a flat woodfree paper (50 g/m$^2$) using coating rod 32 at a dry weight of 14 g/m$^2$ and dried for 30 minutes at 45° C. to provide a heat-sensitive recording material. In this case, starch particles having a particle size of about 15 microns were added to the coating liquid described above and a heat-sensitive recording material was also produced using the coating liquid. Thus, the heat-sensitive recording materials (9) to (17) as shown in Table 2 were prepared.

Each of the recording materials thus prepared was evaluated as in Example 1 and the results thus obtained are shown in Table 2 below.

TABLE 2

| Recording Material | Microcapsule Size (μ) | δ/D | Isocyanates* (wt. part) | Starch Particle | Test Result Friction Fog | Density |
|---|---|---|---|---|---|---|
| (9) (The Invention) | 1 | 0.040 | 10 | — | Almost None | 1.16 |
| (10) (The Invention) | 8 | 0.035 | 10 | — | Almost None | 0.69 |
| (11) (The Invention) | 8 | 0.021 | 5 | — | Slightly Formed | 0.71 |
| (12) (The Invention) | 8 | 0.011 | 2.5 | — | — | 0.75 |
| (13) (Comparison) | 12 | 0.032 | 10 | — | Considerably Formed | 0.30 |
| (14) (Comparison) | 12 | 0.032 | 10 | Added** | Almost None | 0.20 |
| (15) (Comparison) | 12 | 0.010 | 2.5 | Added** | Almost None | 0.23 |
| (16) (Comparison) | 12 | 0.005 | 1.3 | Added** | Slightly Formed | 0.28 |
| (17) | 12 | 0.005 | 1.2 | Added** | Considerably | 0.28 |

TABLE 2-continued

| Recording Material | Microcapsule Size (μ) | δ/D | Isocyanates* (wt. part) | Starch Particle | Test Result Friction Fog | Density |
|---|---|---|---|---|---|---|
| (Comparsion) | | | | | Formed | |

*Addition product of xylylene diisocyanate and trimethylolpropane.
**75% by weight of solid component of capsules was added.

As is clear from the results shown in Table 2, the recording materials (9) to (12) of this invention containing microcapsules of small capsule sizes might form slight friction fog, but gave no problem for practical use of the recording materials. However, the comparison recording material (13) containing large microcapsules formed considerable fog and gave low image density. The recording material (14) prepared using the coating liquid as for the recording material (13) but further containing starch particles scarcely formed fog, but did show a reduction in image density. Also, in the comparison recording materials having a small addition amount of isocyanate (thin capsule wall thickness), the image density was slightly increased, but the formation of friction fog was also increased.

While the invention has been described in detail and with reference to specific embodiments thereof, it will be apparent to one skilled in the art that various changes and modifications can be made therein without departing from the spirit and scope thereof.

What is claimed is:

1. A heat-sensitive recording material comprising a support having thereon a layer containing microcapsules containing at least a first component capable of causing a coloring reaction as a core material, and at least a second component causing said coloring reaction with said first component in the microcapsules, wherein the microcapsules contain an organic solvent in the cores thereof, the average particle size of the microcapsules is 0.1 to 8 microns, and the value of (number average wall thickness δ (in microns)/volume average particle size D (in microns)) of the microcapsules is $1\times10^{-2}$ to $5\times10^{-1}$.

2. A heat-sensitive recording material as in claim 1, wherein the organic solvent has a boiling point of higher than 180° C.

3. A heat-sensitive recording material as in claim 2, wherein the organic solvent is a phosphoric acid ester or a phthalic acid ester.

4. A heat-sensitive recording material as in claim 2, wherein the organic solvent is an aromatic carboxylic acid ester, a fatty acid ester, an alkylated biphenyl, an alkylated terphenyl, a chlorinated paraffin, an alkylated naphthalene, or a diarylethane.

5. A heat-sensitive recording material as in claim 1, wherein said first coloring component contained in the microcapsules is a leuco dye, and said second coloring component is a developer for coloring the deuco dye.

6. A heat-sensitive recording material as in claim 1, wherein said first coloring component contained in the microcapsules is a diazo compound, and said second coloring component is a coupling agent causing a coupling reaction with said diazo compound.

7. A heat-sensitive recording material as in claim 5, wherein the developer is phenol compound an organic sulfonic acid, a metal salt of an organic sulfonic acid, an organic carboxylic acid, a metal salt of an organic carboxylic acid, ethyl p-oxybenzoate, butyl p-oxybenzoatee, heptyl p-oxybenzoate, benzyl p-oxybenzoate or a clay.

8. A heat-sensitive recording material as in claim 6, wherein the diazo compound is a diazonium salt represented by the formula $$ArN_2^+X^-$$

wherein Ar represents a substituted or unsubstituted aromatic moiety; $N_2^-$ represents a diazonium salt; and $X^-$represents an acid anion.

9. A heat-sensitive recording material as in claim 6, wherein the coloring aid is further contained.

10. A heat-sensitive recording material as in claim 9 wherein the coloring aid is urea, thiourea, a derivative of urea or thiourea, a thiozole, a pyrrole, a pyromidine, a piperazine, a guanidine, an indole, an imidazole, an imidazoline, a triazole, a morpholine, a piperdine, an amidine, a formamidine, or a pyridine.

11. A heat-sensitive recording material as in claim 1, wherein the value of (number average wall thickness δ(in microns)/volume average particle size D (in microns)) of the microcapsules is above $2\times10^{-2}$.

12. A heat-sensitive recording material as in claim 5, wherein the value of (number average wall thickness δ(in microns)/volume average particle size D (in microns)) of the microcapsules is above $2\times10^{-2}$.

13. A heat-sensitive recording material as in claim 6, wherein the value of (number average wall thickness δ(in microns)/volume average particle size D (in microns)) of the microcapsules is above $2\times10^{-2}$.

14. A heat-sensitive recording material as in claim 7, wherein the developer is a phenol compound having a melting point of from 60° to 200° C.

15. A heat-sensitive recording material as in claim 5, wherein the leuco dye is used in an amount of from 0.05 to 0.4 $g/m^2$, and the developer is used in an amount of from 0.5 to 4 $g/m^2$.

16. A heat-sensitive recording material as in claim 6, wherein the diazo compound is used in an amount of from 0.05 to 2.0 $g/m^2$, and the coupling agent is used in an amount of from 0.1 to 10 parts by weight per part by weight of the diazo compound.

17. A heat-sensitive recording material as in claim 9, wherein the diazo compound is used in an amount of from 0.05 to 2.0 $g/m^2$, the coupling agent is used in an amount of from 0.1 to 10 parts by weight per part by weight of diazo compound, and the coloring aid is used in an amount of from 0.1 to 20 parts by weight per part by weight of the diazo compound.

18. A heat-sensitive recording material as in claim 5, wherein the leuco dye has a partial skeleton capable of causing ring opening or cleavage by the contact with a developer.

19. A heat-sensitive recording material as in claim 5, wherein said second coloring component is present outside of the microcapsules.

20. A heat-sensitive recording material as in claim 6, wherein said second coloring component is present outside of the microcapsules.

* * * * *